(12) United States Patent
Fraser et al.

(10) Patent No.: US 7,125,430 B2
(45) Date of Patent: Oct. 24, 2006

(54) MANUFACTURING PROCESS AND APPARATUS FOR ELECTRICALLY INSULATING LAYERS OF ELECTROCHEMICAL CELL LAMINATES

(75) Inventors: Serge Fraser, Boucherville (CA); Gilles Gagnon, Repentigny (CA); Fabrice Regisser, Varennes (CA); Félix Carrier, Montreal (CA)

(73) Assignee: Avestor Limited Partnership, Boucherville (CA)

( * ) Notice: Subject to any disclaimer, the term of this patent is extended or adjusted under 35 U.S.C. 154(b) by 361 days.

(21) Appl. No.: 10/378,635

(22) Filed: Mar. 5, 2003

(65) Prior Publication Data
US 2004/0172808 A1    Sep. 9, 2004

(51) Int. Cl.
*H01M 10/04* (2006.01)
(52) U.S. Cl. .................................... 29/623.1; 29/623.5
(58) Field of Classification Search ............... 29/623.1, 29/623.5, 730; 118/313, 314, 315, 316
See application file for complete search history.

(56) References Cited

U.S. PATENT DOCUMENTS

| | | | |
|---|---|---|---|
| 3,880,118 A | | 4/1975 | Milleson ...................... 118/621 |
| 4,231,806 A | * | 11/1980 | Henry ..................... 118/314 X |
| 4,338,364 A | * | 7/1982 | Kennon et al. ......... 118/316 X |
| 5,501,735 A | * | 3/1996 | Pender .................... 118/314 X |
| 6,265,020 B1 | * | 7/2001 | Allardyce et al. ...... 118/314 X |
| 6,616,714 B1 | | 9/2003 | Gauthier et al. ........... 29/623.1 |
| 6,749,650 B1 | * | 6/2004 | Gonzalez et al. .......... 29/623.5 |
| 2001/0007698 A1 | * | 7/2001 | Kutilek ....................... 427/289 |

FOREIGN PATENT DOCUMENTS

| | | |
|---|---|---|
| EP | 0 987 782 A2 | 3/2000 |
| JP | 10 43815 | 2/1998 |

* cited by examiner

*Primary Examiner*—Stephen J. Kalafut
(74) *Attorney, Agent, or Firm*—Osler, Hoskin & Harcourt LLP

(57) ABSTRACT

A manufacturing process and an apparatus to carry out the process are disclosed which eliminate or at least significantly reduce the occurrence of damaging localized short circuits in the production of electrochemical generators. The process and apparatus include cauterization by oxidation of the anode edges of multiple electrochemical cell laminates thereby rendering the anode edges electrically insulated from adjacent cathodes and/or current collectors.

11 Claims, 5 Drawing Sheets

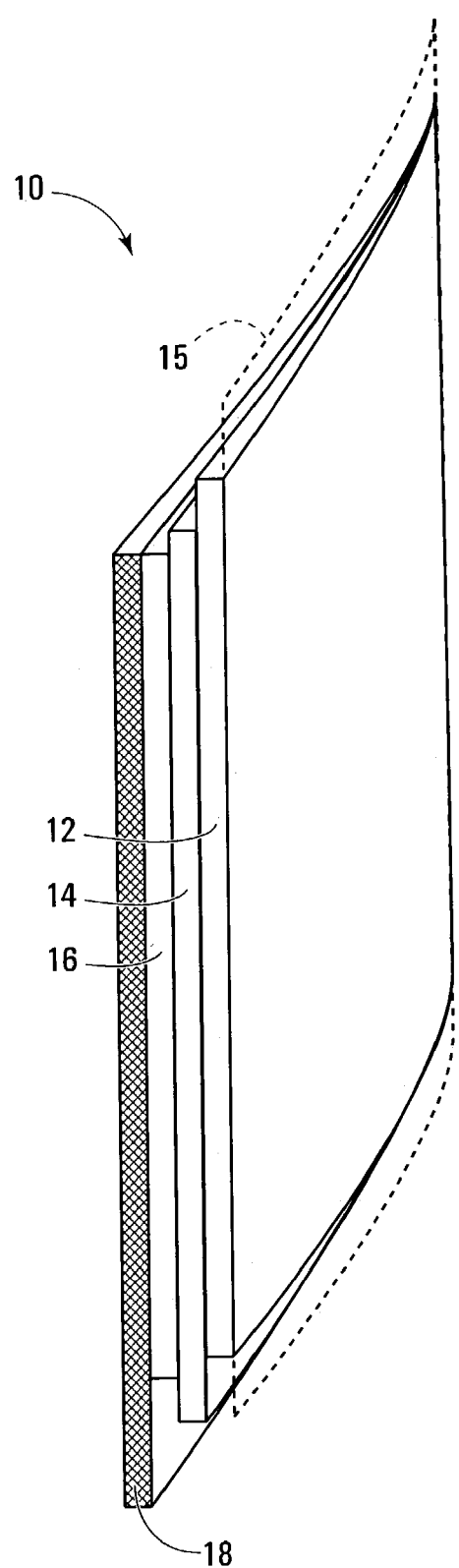
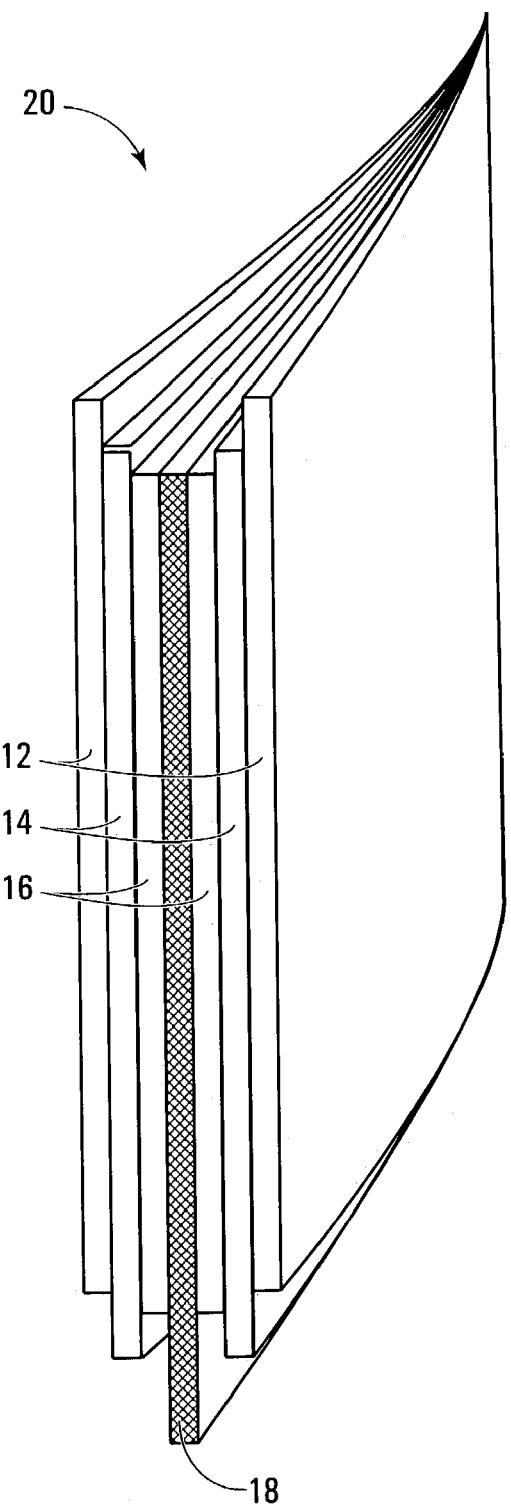
FIG. 1  FIG. 2

MANUFACTURING PROCESS AND APPARATUS FOR ELECTRICALLY INSULATING LAYERS OF ELECTROCHEMICAL CELL LAMINATES

FIELD OF THE INVENTION

The present invention generally relates to alkali metal polymer electrochemical cell laminates and, more specifically, to the electrical insulation of positive and negative layers of electrochemical cell laminates.

BACKGROUND OF THE INVENTION

Rechargeable batteries manufactured from laminates of solid polymer electrolytes and sheet-like electrodes display many advantages over conventional liquid electrolyte batteries. These advantages include: lower overall battery weight, high power density, high specific energy, and longer service life. In addition, they are more environmentally friendly since the danger of spilling toxic liquid into the environment is eliminated.

Solid polymer cell components typically include positive electrodes (also referred to as cathodes), negative electrodes (also referred to as anodes), and a separator material capable of permitting ionic conductivity, such as a solid polymer electrolyte, sandwiched therebetween. Moreover, a current collector can also be associated with either one of the electrodes, especially the cathode.

Typical electrochemical generators comprise a plurality of individual electrochemical cells stacked or bunched together to form a battery. The electrochemical cells may be of a mono-face configuration or a bi-face configuration. As illustrated in FIG. 1, an electrochemical cell 10 having a mono-face configuration is a laminate including a current collector 18, a cathode 16, an electrolyte separator 14, and an anode 12, which is covered with an insulating polypropylene film 15 to insulate the electrochemical cell from an adjacent electrochemical cell in order to prevent short circuits. The current collector 18 is typically a 15–25 µm thick carbon coated aluminum foil; the cathode layer 16 is typically a 10–100 µm thick composite; the electrolyte separator 14 is typically a 20–80 µm thick polymer and alkali metal salt layer; the anode layer 12 is typically a lithium or lithium alloy metal foil 15–80 µm thick; and the polypropylene film 15 is typically 12–26 µm thick.

As illustrated in FIG. 2, an electrochemical cell 20 having a bi-face configuration is a laminate including a central current collector 18 having a cathode 16 on both of its sides, an electrolyte separator 14 adjacent each cathode 16, and an anode 12 adjacent each electrolyte separator 14. The typical thickness of each of the components is similar to that of the mono-face cell laminate previously described. In a bi-face configuration, the insulating polypropylene film is eliminated since the anode of a first cell is not adjacent to the cathode of a second cell and therefore cannot short circuit directly.

As illustrated in FIGS. 1 and 2, the thin film anodes 12 and cathodes 16 are laminated in an offset pattern, the anodes 12 protruding on one side of the laminate and the cathode current collectors 18 protruding on the other side of the laminate such that when a series of laminates are stacked into an electrochemical cell, all protruding anodes 12 can be connected together and all protruding cathode current collectors 18 can be connected together. The electrolyte separator 14 is positioned and sized in such a manner that it completely separates the anodes from the cathodes to prevent short circuiting between the two.

One manufacturing process consists in laminating the thin films of anode, electrolyte separator, cathode and cathode current collector into mono-face or bi-face configurations using a continuous manufacturing process and cutting the laminates to size prior to stacking. The laminates are cut perpendicular to their longitudinal axis. The cutting operation is delicate because it exposes the edges of each layer of the laminate; the electrolyte separator no longer extending beyond the anode layer and the cathode current collector layer to ensure adequate electrical insulation. Furthermore, the cutting operation may cause burring of the anode layers or of the current collector with the effect that the burred metal edges may extend over the electrolyte separator and contact the opposite anode or cathode thereby causing a short circuit which renders the laminate unusable. At the very least, the cutting operation results in the precarious situation of having the exposed edges of the anode and cathode/current collector layers only 15–25 µm apart; any mechanical deformation of any of the layers (anode, cathode, current collector and separator) potentially causing a short circuit. Since there may be variations in the volume (e.g., the thickness) of the laminate, and specifically that of the the cathode, in the charge and discharge modes of the battery, leaving the exposed edges of the laminates unattended represents a risk of future short circuit.

Another manufacturing process consists in stacking previously cut thin films of anode and previously cut mono-face or bi-face half-cells comprising a current collector, cathode and electrolyte separator. Again, the cutting operations may have caused burring of the edges of the anode films and/or of the metal current collector foil causing the burred metal edges to extend over the electrolyte separator after lamination into electrochemical cells potentially resulting in short circuits.

Once the various layers of the laminates are stacked to form an electrochemical cell bundle, the ends of the electrochemical cell bundle are a series of freshly cut and exposed anode, separator and cathode edges which can easily cause short circuits during assembly of the electrochemical generator or later on when the generator is put into service.

Thus there is a need in the manufacturing of electrochemical generators and bundles, for a process and apparatus for preventing short circuits between the edges of the various layers of an electrochemical cell laminate or laminates.

SUMMARY OF THE INVENTION

Under a first broad aspect, the invention seeks to provide a process for assembling an alkali metal polymer electrochemical generator comprising stacking a plurality of electrochemical cell laminates to form a bundle having a pair of sides. Each electrochemical cell laminate includes an alkali metal anode, an electrolyte separator, a cathode and a cathode current collector. The process also comprises applying reactive fluid onto at least one side of the bundle such as to oxidize an exposed edge of at least one of the alkali metal anodes and thereby dissolve a portion of the exposed edge. The exposed edge recedes away from the at least one side of the bundle for preventing electrical contact between the alkali metal anodes and adjacent cathodes or cathode current collectors.

Preferably, the bundle of laminates is covered at least in part with a protective layer adapted to seal the bundle with the exception of the at least one side. Advantageously, the protective layer is a protective casing having at least one opening for alignment with the at least one side.

Under a second broad aspect, the invention also seeks to provide an apparatus for electrically insulating at least one side of an electrochemical bundle which includes a plurality of electrochemical cell laminates. Each electrochemical cell laminate includes an alkali metal anode, an electrolyte separator, a cathode and a cathode current collector. The apparatus comprises a first nozzle for applying a reactive fluid onto at least one side of the bundle for oxidizing an exposed edge of at least one of the alkali metal anode layers. The apparatus also comprises a second nozzle for applying an air stream to dry the at least one side of the bundle, and means for transporting the bundle such that the at least one side of the bundle is exposed to the second nozzle after first being exposed to the first nozzle.

Advantageously, the apparatus further comprises a containment cover enclosing the first and second nozzles. The containment cover includes a ventilation aperture connected to a ventilation pump whereby the oxidation and drying of the at least one side of the bundle may be carried out under ventilation.

Preferably the apparatus further comprises a protective layer covering at least in part the bundle for sealing the bundle with the exception of the at least one side. Advantageously, the protective layer is a protective casing comprising at least one opening at one extremity thereof for exposing the at least one side of the bundle while sealing the remaining portion of the bundle.

Under a third broad aspect, the invention also seeks to provide a process for electrically insulating an electrochemical bundle including a stack of electrochemical cell laminates. Each electrochemical cell laminate includes an alkali metal anode, an electrolyte separator, a cathode and a cathode current collector. The process comprises applying reactive fluid onto at least one side of the bundle such as to oxidize an exposed edge of at least one of the alkali metal anodes for preventing electrical contact between the at least one alkali metal anode and adjacent cathodes or cathode current collectors. The process also comprises drying the at least one side of the bundle.

BRIEF DESCRIPTION OF THE DRAWINGS

A detailed description of preferred embodiments of the present invention is provided herein below with reference to the following drawings, in which:

FIG. 1 is a schematic view of a typical mono-face electrochemical cell laminate;

FIG. 2 is a schematic view of a typical bi-face electrochemical cell laminate;

Figure 3A:
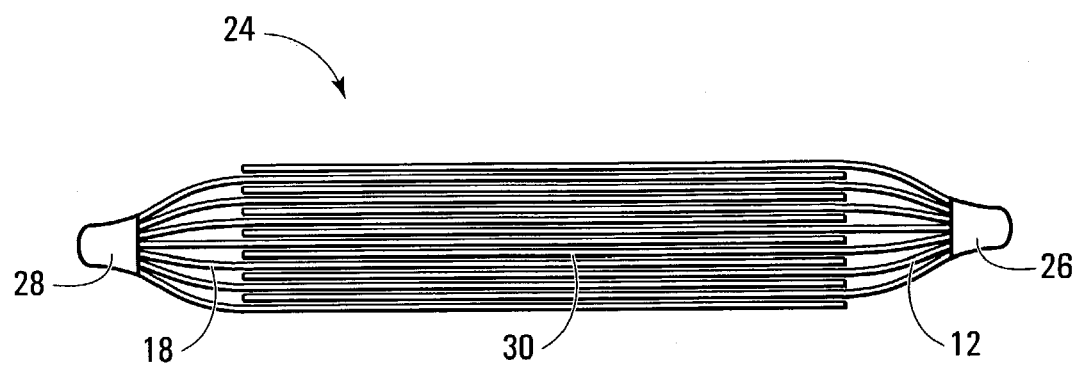
FIG. 3A is a schematic side elevational view of a plurality of electrochemical cell laminates stacked and connected together such as to form an EC bundle.

In the drawings, preferred embodiments of the invention are illustrated by way of examples. It is to be expressly understood that the description and the drawings are only for the purpose of illustration and as an aid to understanding. They are not intended to be a definition of the limits of the invention.

DETAILED DESCRIPTION

Figure 3B:
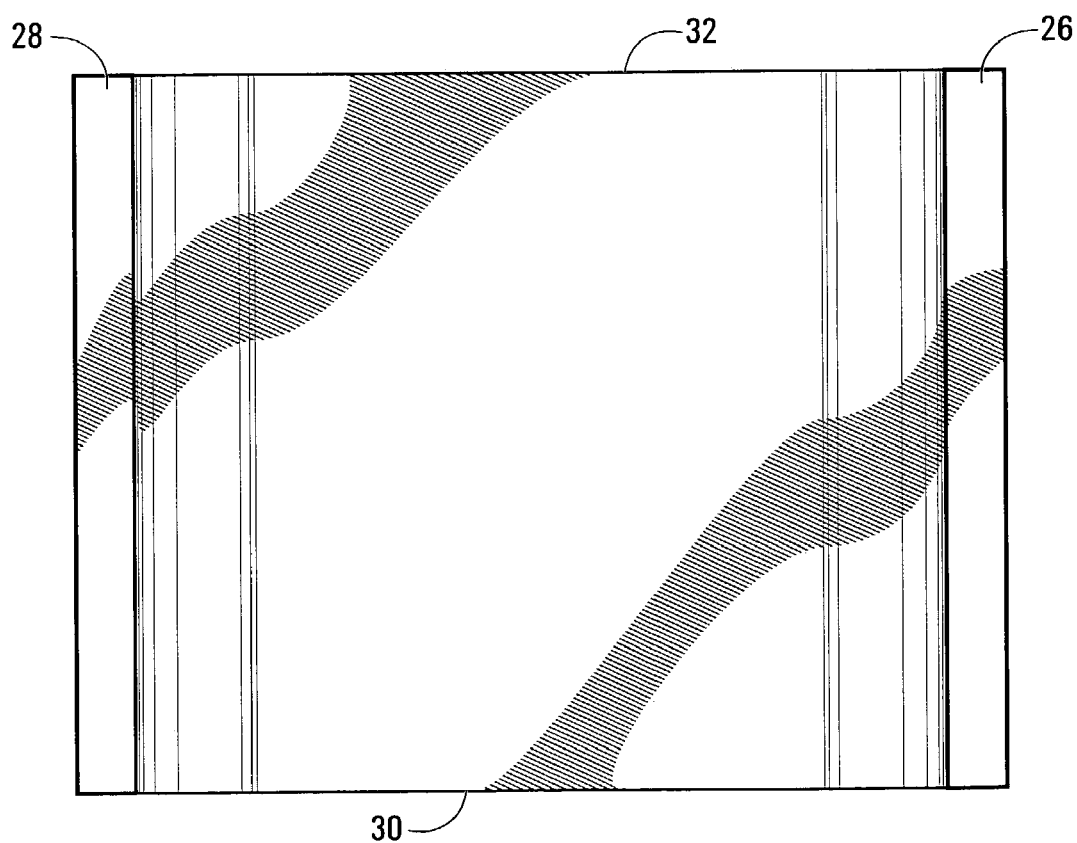
FIG. 3B is a schematic top view of the EC bundle shown in FIG. 3A.

FIGS. 3a and 3b schematically illustrate an embodiment of an electrochemical cell bundle 24 (EC bundle) comprising a plurality of mono-face or bi-face laminate cells stacked together. The protruding ends of the anode layers 12 of the EC cells are electrically connected together by any suitable means to form a negative pole 26 of the EC bundle 24. Similarly, the protruding ends of each cathode current collector 18 are electrically connected together by any suitable means to form the positive pole 28 of the bundle 24.

As shown in FIG. 3b, the sides 30 and 32 of EC bundle 24 consists of the cut portions of each laminate. This leaves the freshly cut anode layer 12 exposed. In addition, every other layer of the EC cell, such as electrolyte separator 14, cathode layer 16 and current collectors 18 are similarly exposed. As previously described, the cutting operation may have burred the sides of the anode layers 12, and of the current collectors 18 in such a way that electrical contacts between the negative elements (anode) and adjacent positive elements (cathodes and/or current collectors) may occur. This can cause localized short circuits, and significantly reduce the performance of the stacked EC bundle 24.

To eliminate or at least reduce the occurrence of damaging localized short circuits, a manufacturing process and an apparatus to carry out this process have been developed. In this process, the sides 30 and 32 of EC bundle 24 and, more specifically, the anode edges of sides 30 and 32 of EC bundle 24 are cauterized by oxidation. This causes the anode edges to be electrically insulated from adjacent cathodes and/or current collectors.

Figure 4:
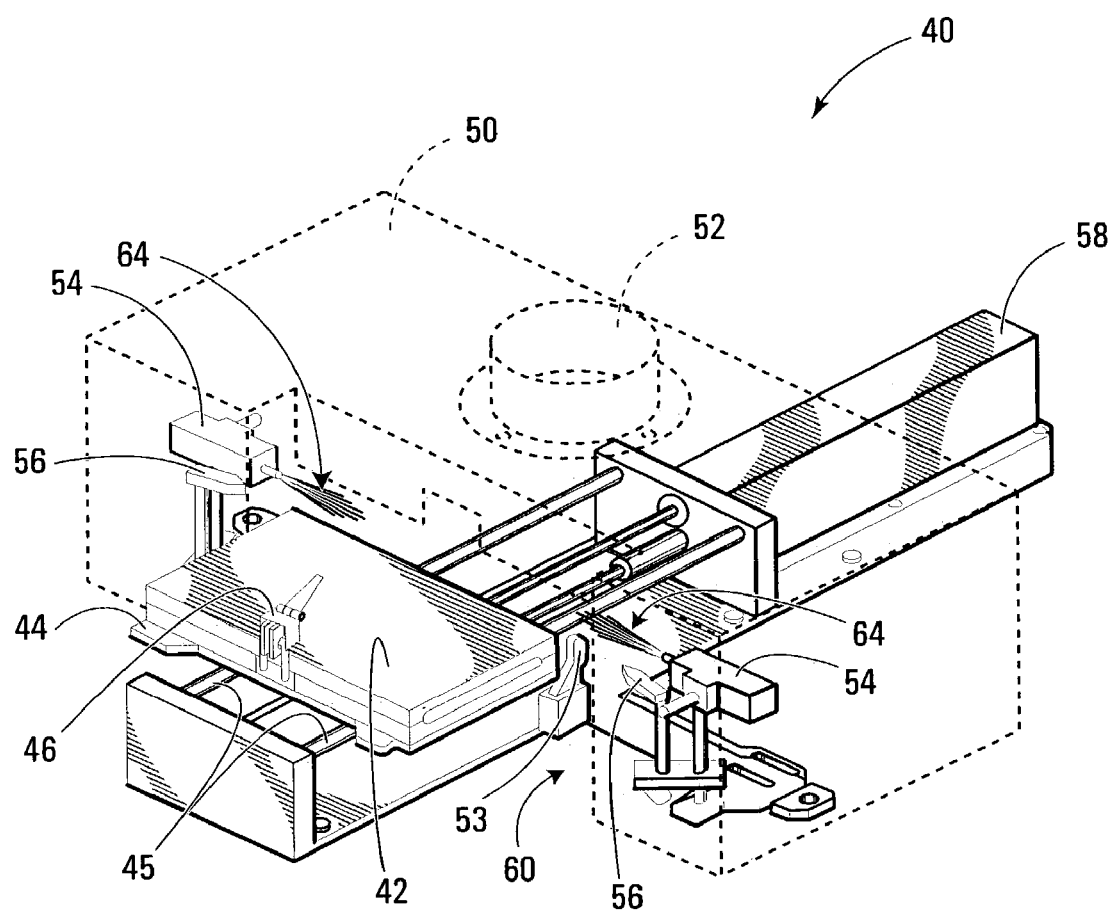
FIG. 4 is a schematic perspective view of an apparatus for oxidizing the edges of an EC bundle according to one embodiment of the invention.

FIG. 4 illustrates one possible embodiment of an apparatus 40 adapted to oxidize the sides 30 and 32 of an EC bundle 24. Apparatus 40 comprises a containment cover 50 having a ventilation aperture 52 (all shown in dashed lines for clarity), a pair of fluid spraying nozzles 54, a pair of air stream nozzles 56, and a wheeled platform 44 mounted on a railing system 45 which is actuated back and forth by reciprocating means 58 such as a pneumatic or hydraulic piston-cylinder assembly, an endless screw or a rack and pinion mechanism.

Figure 6:
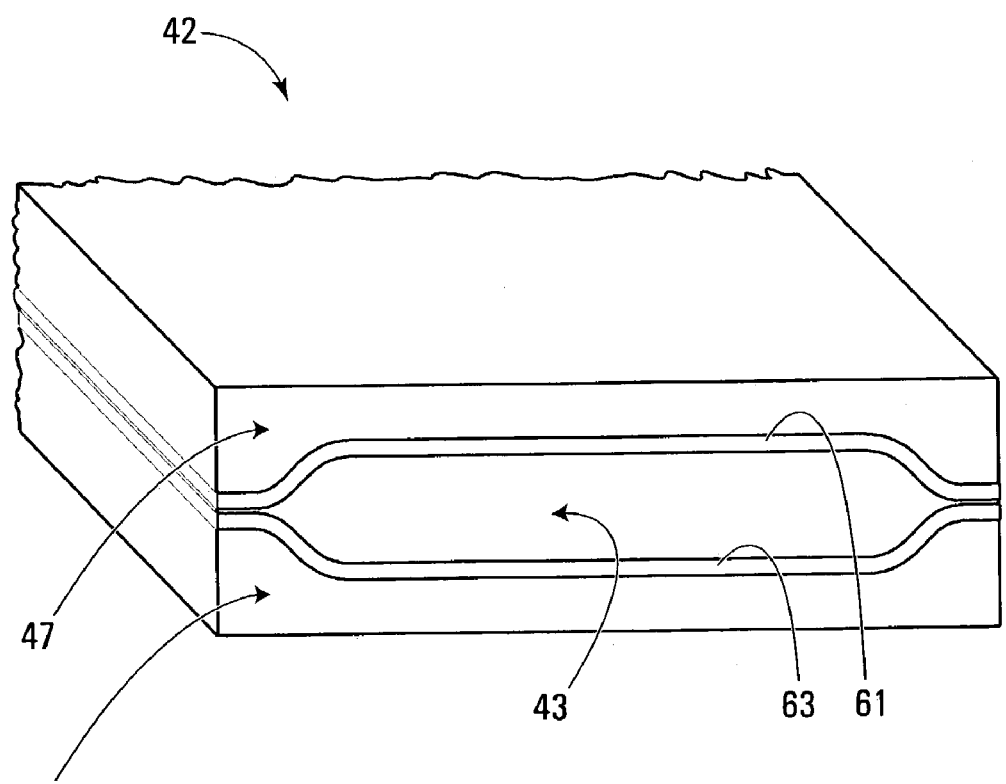
FIG. 6 is a partial perspective view of one extremity of a protective casing adapted to protect the EC bundle.

The EC bundle 24 is installed in a protective casing 42 which is adapted to seal the entire EC bundle 24 with the exception of its sides 30 and 32. As shown in FIG. 6, the protective casing 42 comprises an opening 43 at each extremity thereof for exposing the sides 30 and 32 of EC bundle 24 while sealing the main body of EC bundle 24. Protective casing 42 includes two sections 47 and 49 which are shaped such as to be able to sandwich EC bundle 24. A band of foam or rubber 61 and 63 is positioned along the lips of opening 43 to hermetically seal EC bundle 24 and only leave each side 30 and 32 exposed.

Again referring to FIG. 4, the protective casing 42 enclosing EC bundle 24 is securely mounted on wheeled platform 44 via a quick release fastener 46, or any other suitable fastening means. Once installed, the EC bundle 24 is connected to a voltmeter (not shown) so that its voltage may be monitored through the cauterization process. The reciprocating means 58 is then activated and the wheeled platform 44 carrying EC bundle 24 moves into containment cover 50 through a door 60 at a constant speed along a path defined by railing system 45. The path of the railing system 45 is such that the openings 43 of protective casing 42 will pass directly in front of the pair of spraying nozzles 54. The spraying nozzles 54 are activated by a sensor 53 triggered as wheeled platform 44 enters the cauterization zone. Each nozzle 54 sprays a jet 64 of fluid, such as pressurized water particles, directly onto the sides 30 and 32 of EC bundle 24, which are exposed through openings 43 of protective casing 42, as the platform 44 travels at constant speed. The entire exposed surface of sides 30 and 32 is therefore sprayed with water particles.

Figure 5:
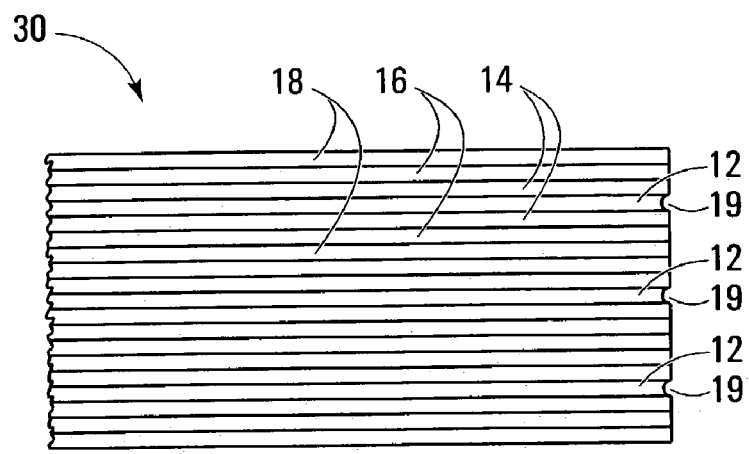
FIG. 5 is a cross-sectional view showing the side of an EC bundle after having been oxidized.

The sprayed water particles in contact with the exposed edges of the anode layers, which generally comprise lithium or a lithium alloy, results in the fairly rapid oxidation of the anode edges. As shown in FIG. 5, which illustrates a cross-sectional view of side 30 of an EC bundle 24 after having been sprayed with water particles, the edges of the of the anode layers 12 have been oxidized by the water particles. The edges have partly dissolved and have receded from the side 30 thereby leaving a void or cavity 19 in its stead such that any electrical contact between the receded edge of each anode layer 12 and the adjacent cathode 16 or current collector 18 becomes impossible since the edges of the electrolyte separator layers 14 located on both sides of the void 19 effectively prevent any such electrical contact. When the oxidation reaction is completed, the sides 30 and 32 of EC bundle 24 can no longer cause localized short circuits since the anode side edges have receded sufficiently beyond reach of the adjacent cathodes 16 and current collectors 18 to render them effectively electrically insulated.

The wheeled platform 44 carrying bundle 24 continues its course until the entire length of each opening 43 has been sprayed. At this point, the reciprocating means 58 stops the movement of platform 44 and the water spaying nozzles 54 are shut down. The platform 44 carrying bundle 24 may rest at the end of its course for a length of time sufficient to allow the edges of the anodes 12 to chemically react with the water particles and to recede sufficiently.

Afterward, the reciprocating means 58 moves platform 44 in the opposite direction towards door 60 at which time, the pair of air stream nozzles 56 are activated. A high velocity air jet is directed towards each opening 43 and thus toward the sides 30 and 32 of EC bundle 24, thereby sweeping the remaining water particles off the sides 30 and 32 and completely drying EC bundle 24 as it exits containment cover 50. The water particles as well as any lithium oxides generated by the chemical reaction process are evacuated through the ventilation aperture 52 which is connected to an air pump (not shown) that creates an air flow under the containment cover 50. Platform 44 activates a sensor (not shown) as it exits the air stream nozzles 56 range thereby relaying a signal that shuts off the air stream nozzles 56.

When the edges of the anodes 12 are initially sprayed, a noticeable voltage drop occurs at the poles of EC bundle 24 as the water particles are electrically conductive and temporarily create short circuits. However when the anode edges have receded and have dried, the voltage at the poles of EC bundle 24 rises back up to its initial voltage or higher since localized short-circuits that may have been present initially have been eliminated.

The entire sequence (oxidation, rest and drying) is carried out under the containment cover 50 and is therefore ventilated.

The automation of the process outlined above is simple and well within the grasp of a person skilled in the art of automation. The spaying nozzles 54 are fully adjustable. The pressure, velocity and shape of the jets may be modified and adjusted as any typical spraying device. As well, the air stream nozzles 56 are also fully adjustable; the pressure, velocity and shape of the air jets may be modified and adjusted as any typical spraying device.

It should be expressly noted that although the preferred fluid for oxidizing the anode edges is water or distilled water, other fluids may be used as well. Examples include alcohols such as methanol, halogenated compounds, sulphured compounds and oxygenated compounds. Moreover, although the anode layer described in the above embodiments generally comprises lithium or a lithium alloy, it should be expressly noted that anode layers comprising other types of materials such as other alkali metals remain within the scope of the present invention.

Figure 7:
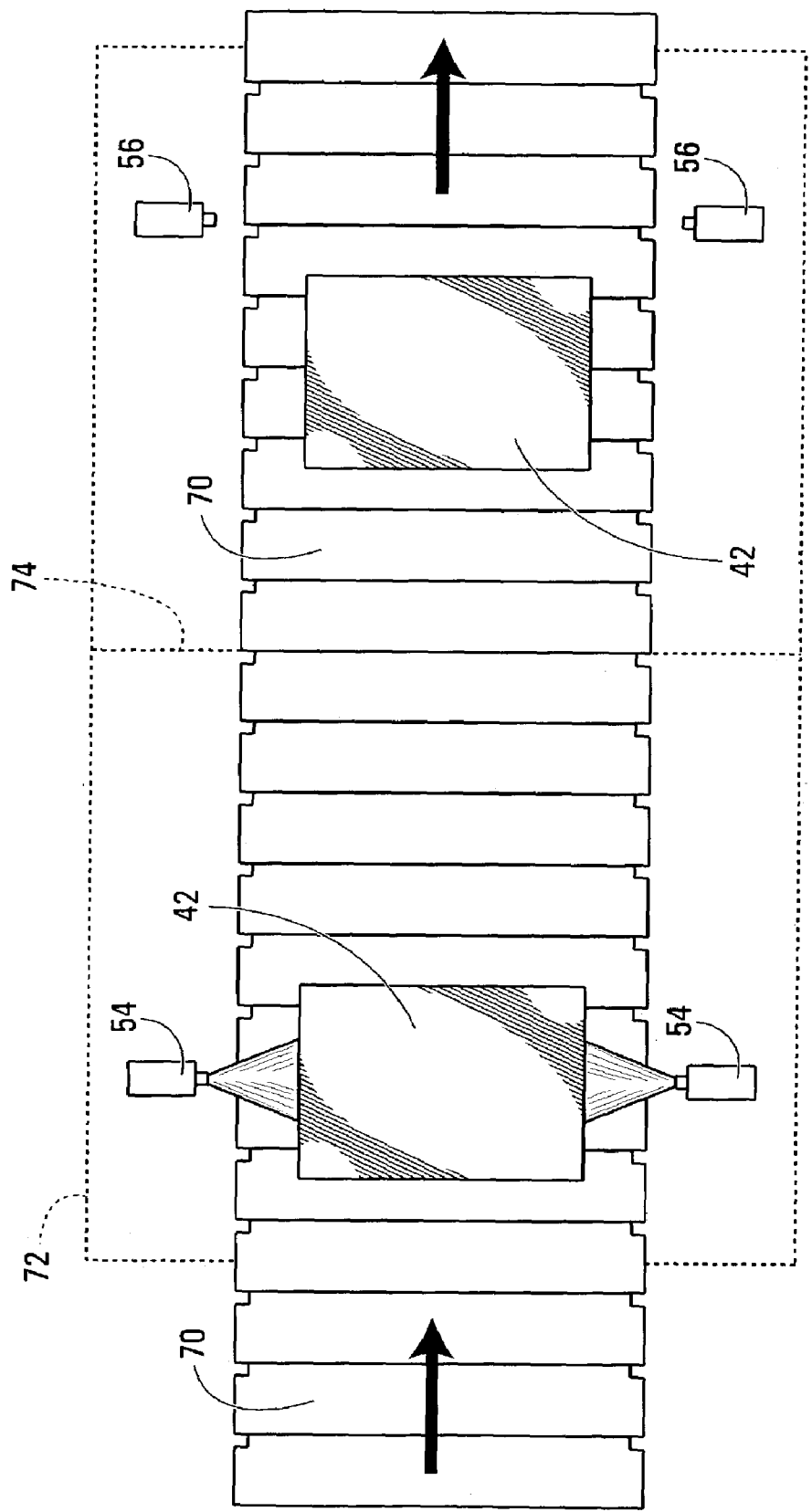
FIG. 7 is a schematic top plan view of an apparatus for oxidizing the edges of EC bundles according to a second embodiment of the invention.

In addition, it should be understood that the above-described apparatus is but one example of implementation of the manufacturing process of cauterizing and electrically insulating the sides of an EC bundle 24. In this particular example of implementation, a single EC bundle is oxidized per cycle. FIG. 7 illustrates another example of implementation of the invention in which the manufacturing process is carried out continuously. The EC bundles 24 are enclosed in a protective casing similar to protective casing 42. An endless belt 70 is used to carry a plurality of EC bundles one after the other through an oxidation station defined by a pair of water spaying nozzles 54 and then through a drying station defined by a pair of air stream nozzles 56 before exiting. The distance between nozzles 54 and 56 act as a resting period to allow the sides of the EC bundle to oxidize and the anode edges to recede sufficiently. The oxidation station and the drying station are enclosed within a containment cover 72 (illustrated in dotted lines for clarity) that comprises a ventilation system such that process is ventilated to evacuate excess water particle and lithium oxides generated by the chemical reactions. The two stations may be isolated from each other with a partition 74 such that the oxidation process does not interfere with the drying process. As well sensors may be positioned along the path of the protective casing 42 to activate and deactivate the water spaying nozzles 54 and the air stream nozzles 56.

Although FIG. 7 illustrates an implementation of the manufacturing process carried out along a substantially horizontal plane, the process may alternatively be carried out vertically or on different levels without departing from the scope and spirit of the invention.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A process for assembling an alkali metal polymer electrochemical generator, said process comprising:
   stacking a plurality of electrochemical cell laminates to form a bundle having a pair of sides, each of said electrochemical cell laminates including:
   a) an alkali metal anode;
   b) an electrolyte separator;
   c) a cathode;
   d) a cathode current collector;
   covering said bundle at least in part with a protective layer for sealing said bundle with the exception of at least one side of said bundle;

applying reactive fluid onto said at least one side of said bundle such as to oxidize an exposed edge of at least one of said alkali metal anodes and thereby dissolve a portion of said exposed edge, said exposed edge receding away from said at least one side of said bundle for preventing electrical contact between said alkali metal anodes and adjacent cathodes or cathode current collectors.

2. A process as defined in claim 1 wherein said protective layer is a protective casing having at least one opening for alignment with said at least one side.

3. A process as defined in claim 1 wherein said fluid is applied in the form of a jet spray.

4. A process as defined in claim 1, wherein said alkali metal anode comprises lithium metal or lithium metal alloys.

5. A process as defined in claim 1, wherein said fluid is selected from the group consisting of water, distilled water, alcohol, methanol, halogenated compounds, sulphured compounds and oxygenated compounds.

6. A process as defined in claim 5, wherein said fluid is water or distilled water.

7. A process as defined in claim 5, wherein said fluid is methanol.

8. A process as defined in claim 1, further comprising drying said at least one side of said bundle using an air stream jet.

9. A process as defined in claim 1, further comprising monitoring the voltage of said bundle throughout said process.

10. A process as defined in claim 1, wherein said process is carried out in a ventilated area to evacuate said fluid and particles from the oxidized portion of said exposed edge.

11. A process for electrically insulating an electrochemical bundle, the bundle including a stack of electrochemical cell laminates, each laminate including an alkali metal anode, an electrolyte separator, a cathode and a cathode current collector, said process comprising:

covering the bundle at least in part with a protective layer for sealing the bundle with the exception of at least one side of the bundle;

applying reactive fluid onto the at least one side of the bundle such as to oxidize an exposed edge of at least one of the alkali metal anodes for preventing electrical contact between the at least one alkali metal anode and adjacent cathodes or cathode current collectors;

drying the at least one side of the bundle.

* * * * *